US009521463B2

(12) United States Patent
Lee et al.

(10) Patent No.: US 9,521,463 B2
(45) Date of Patent: Dec. 13, 2016

(54) METHOD AND SYSTEM OF USING IDLE RECEIVING UNIT RESOURCES FOR RECEIVING CONTENT AND COMMUNICATING THE CONTENT TO OTHER RECEIVING UNITS IN THE NETWORK

(75) Inventors: Sean S. Lee, Rockville, MD (US); Scott D. Casavant, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 136 days.

(21) Appl. No.: 13/106,094

(22) Filed: May 12, 2011

(65) Prior Publication Data

US 2011/0213858 A1    Sep. 1, 2011

Related U.S. Application Data

(62) Division of application No. 12/060,935, filed on Apr. 2, 2008, now abandoned.

(51) Int. Cl.
| | |
|---|---|
| H04N 21/61 | (2011.01) |
| H04N 21/41 | (2011.01) |
| H04N 21/4147 | (2011.01) |
| H04N 21/436 | (2011.01) |
| H04N 21/442 | (2011.01) |
| H04N 21/482 | (2011.01) |
| H04L 29/08 | (2006.01) |

(52) U.S. Cl.
CPC ...... *H04N 21/6143* (2013.01); *H04N 21/4135* (2013.01); *H04N 21/4147* (2013.01); *H04N 21/43615* (2013.01); *H04N 21/4424* (2013.01); *H04N 21/44231* (2013.01); *H04N 21/482* (2013.01); *H04L 67/28* (2013.01); *H04L 67/2861* (2013.01)

(58) Field of Classification Search
CPC ............ H04N 21/4334; H04N 21/4147; H04N 21/43615; H04N 5/76; H04N 5/775; G11B 2220/412; H04L 65/4084
USPC ........ 709/201, 203, 217, 226, 229, 231, 232
See application file for complete search history.

(56) References Cited

U.S. PATENT DOCUMENTS

| | | | | |
|---|---|---|---|---|
| 7,721,313 | B2 * | 5/2010 | Barrett .................. | H04H 20/63 725/88 |
| 2002/0174430 | A1 * | 11/2002 | Ellis ..................... | G11B 27/005 725/46 |
| 2005/0078678 | A1 | 4/2005 | Kim et al. | |
| 2005/0108769 | A1 * | 5/2005 | Arnold et al. ................ | 725/115 |
| 2006/0117374 | A1 * | 6/2006 | Kortum .................. | H04N 5/782 725/139 |
| 2006/0156342 | A1 * | 7/2006 | Xiao .................. | H04N 5/44543 725/50 |
| 2006/0174309 | A1 * | 8/2006 | Pearson ............ | G06F 17/30053 725/134 |

(Continued)

*Primary Examiner* — Backhean Tiv
(74) *Attorney, Agent, or Firm* — Harness, Dickey & Pierce, PLC

(57) ABSTRACT

A method and system for providing content includes a network having a plurality of receiving units. The system further includes a first receiving unit of the plurality of receiving units that forms a recording request, when the first receiving unit includes unavailable resources and communicates the recording request through the network. A second receiving unit receives the request and stores content in a second memory corresponding to the request and communicates the content to the first receiving unit.

12 Claims, 8 Drawing Sheets

(56) References Cited

U.S. PATENT DOCUMENTS

| | | | |
|---|---|---|---|
| 2006/0218584 A1* | 9/2006 | Gildred | H04N 5/44543 725/39 |
| 2007/0104456 A1* | 5/2007 | Craner | 386/83 |
| 2007/0146551 A1* | 6/2007 | O'Neil | H04N 5/4401 348/731 |
| 2007/0157266 A1* | 7/2007 | Ellis | H04L 12/2816 725/89 |
| 2009/0010610 A1* | 1/2009 | Scholl | G11B 27/105 386/314 |
| 2009/0103891 A1* | 4/2009 | Harris | H04N 5/44 386/243 |
| 2009/0210533 A1* | 8/2009 | Verhaegh | G06F 17/30209 709/226 |
| 2009/0217332 A1* | 8/2009 | Hindle | H04N 5/782 725/109 |
| 2009/0222875 A1* | 9/2009 | Cheng et al. | 725/147 |

\* cited by examiner

METHOD AND SYSTEM OF USING IDLE RECEIVING UNIT RESOURCES FOR RECEIVING CONTENT AND COMMUNICATING THE CONTENT TO OTHER RECEIVING UNITS IN THE NETWORK

TECHNICAL FIELD

The present disclosure relates generally to communicating content to a user and, more specifically, to a method of using idle system resources to receiving broadcasted programming or content and communicating the content to other receiving units in the network.

BACKGROUND

The statements in this section merely provide background information related to the present disclosure and may not constitute prior art.

Consumers increasingly desire access to various types of content, including music, videos, games, and the like. To meet these needs, content providers are increasingly investigating ways to provide content in a timely manner to consumers.

Satellite distribution systems are one way in which to provide content to various consumers. Pay-per-view and regular broadcasts are available in a satellite system. In a pay-per-view system, access is provided to users for a particular program that is watched by more than one user at the same time. Recording means in the receiving units may be used to store the content for later playback.

In homes, satellite-receiving boxes called integrated receiver decoders or set top boxes are used for receiving satellite signals. Each of the boxes, if equipped with a digital video recorder or other recording device, may store programming content therein. Because each of the user devices acts independently, several of the receiving devices may be recording the identical content. Further, each receiving device may contain only a limited number of tuners. Therefore, if various numbers of programming content are desired that overlap in time, the content cannot be recorded due to the limited number of tuners.

SUMMARY

The present disclosure sets forth a method and apparatus for sharing resources between various numbers of networked receiving units. The receiving units may be in a single household or may be located in a particular geographic area.

In one aspect of the disclosure, a method includes forming a network having a plurality of receiving units including a first receiving unit and a second receiving unit, generating a recording request at the first receiving unit, when the first receiving unit includes unavailable resources, communicating the recording request through the network and storing content in a second memory corresponding to the request at the second receiving unit in response to the request.

In a further aspect of the disclosure, a system includes a network having a plurality of receiving units. The system further includes a first receiving unit of the plurality of receiving units that forms a recording request, when the first receiving unit includes unavailable resources and communicates the recording request through the network. A second receiving unit receives the request and stores content in a second memory corresponding to the request and communicates the content to the first receiving unit.

In another aspect of the disclosure, a system includes a network (cluster) having a plurality of receiving units. The system includes a first receiving unit of the plurality of receiving units that forms a recording request. When the first receiving unit includes unavailable resources and communicates the recording request through the network. A second receiving unit receives the request and has a free tuner but no disk space. A third receiving unit has free disk space but no free tuners. That second receiving unit communicates a request for recording space on the third receiving unit. The recording request is thus serviced by having the second receiver tune to the satellite signal and transmit the data stream to the third receiving unit that stores the recording onto its recording device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
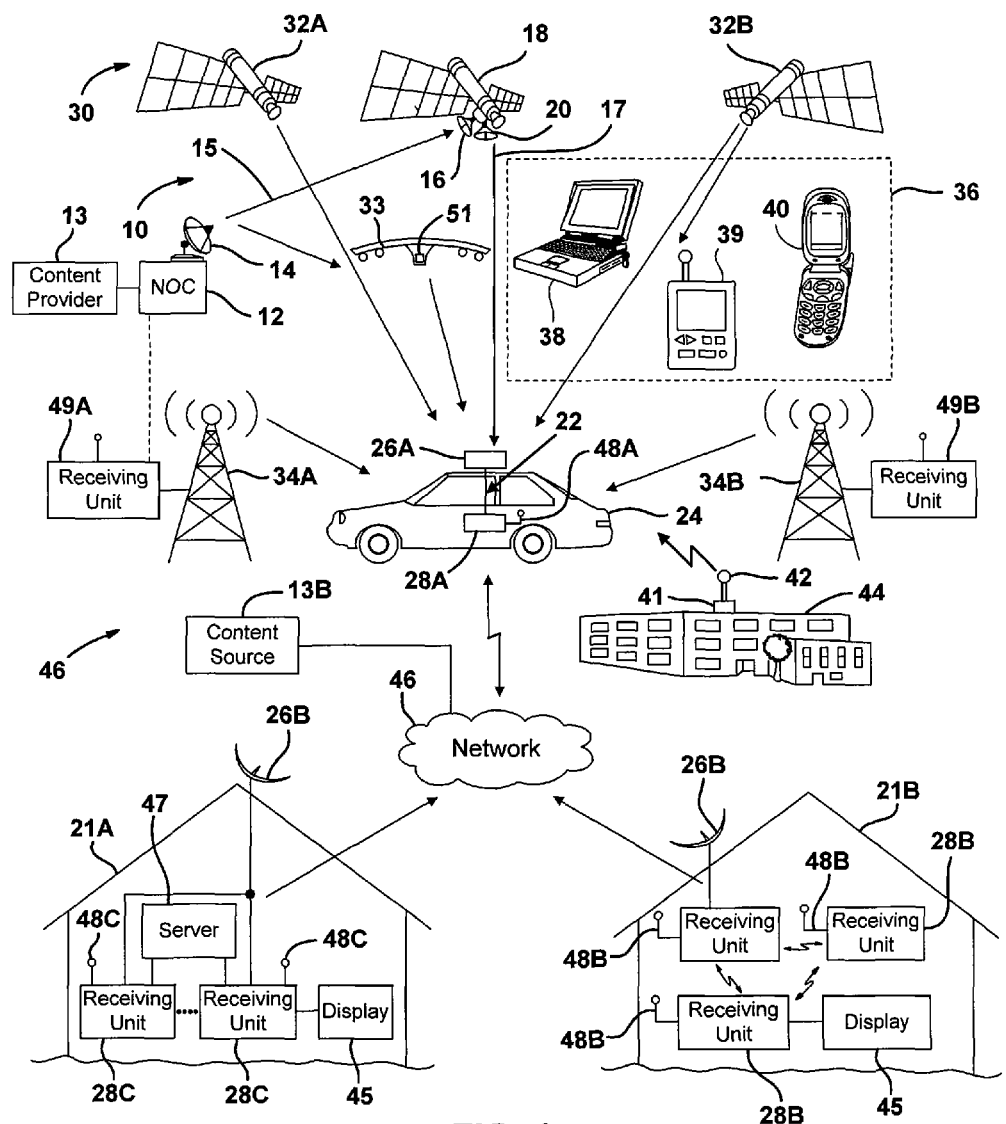
FIG. 1 is a block diagrammatic system view of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDS) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

The present system may be used to better use resources in receiving units that are connected in a network. Each receiving unit may be a satellite television receiving unit, although some may not. The network may be wireless wired or a combination.

Referring now to FIG. 1, a satellite television broadcasting system 10 is set forth in the following example. The satellite television broadcasting system 10 includes a network operations center 12 in communication with various content providers 13. Various programming content may be provided from the content providers 13 including movies, sporting events and the like. The content providers 13 may provide live feeds as well as recorded material. The content providers may thus provide signals or media.

The network operations center 12 generates wireless communication signals 15 through a transmitting antenna 14 which are received by a receiving antenna 16 of a high altitude device such as a spaced-based satellite 18. The wireless communication signals, for example, may be digital, digital video, data or digital audio. As will be described below, the wireless communication signals may be entertainment content, traffic, weather, hazardous material warning areas or advertising marketing. The wireless signals 15 may be referred to as uplink signals.

Wireless communication signals 17 such as downlink signals may be generated from the satellite 18 and may include location-specific signals with location information therein. The location information may correspond to a geographic area in which the location specific information is valid or suitable for. A transmitting antenna 20 or the satellite 18 communicates the downlink signals 17 to various receiving systems including stationary systems such as those in homes 21A, 21B or buildings 44 as well as mobile receiving systems 22. The wireless signals may have various types of information associated with them including location information. The wireless signals may also have various video and audio information associated therewith.

The mobile receiving system 22 is disposed within an automotive vehicle 24. Several mobile systems 22 may be incorporated into a network. The mobile receiving system 22 includes a receiving antenna 26A that receives the wireless signals 17 from the satellite 18 and processes the signals in a receiving unit 28A. The mobile receiving unit 28 will be further described below. The receiving unit 28 may include a network antenna 48A.

The network antennas 48A may be antennas suitable for communicating with other receiving units in a network 46. The vehicle 22 may represent a node of the network 46. The network 46 may be various types of wireless networks such as an 802.11 a/b/g wireless network. Other types of networks may be a WiMax network. The network may also comprise terrestrial components or a combination of terrestrial and satellite components. The network may contain both mobile and stationary receiving units.

The network 46 may be referred to as a mesh network. The receiving units within the network 46 are only capable of communicating a certain distance. Thus, mobile receivers may enter and leave the range of other receivers. Thus, at any given time the network make-up may change.

The network 46 may also include the Internet. The receiving units 28A-C may receive content from a content source 13B through the Internet.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. The towers 34 may also be cellular phone, radio or TV towers generating location signals. Cellular phones typically include a GPS locating system. As the vehicle 24 or mobile devices move, the exact coordinates in latitude and longitude may be used to determine the proper area of interest such as a designated marketing area which will control the mobile device's choices for local television, advertising and other broadcasted data.

Each of the cellular towers 34A and 34B may include respective receiving units 49A and 49B used to receive signals from the satellite and also receives signals from the network. The receiving units 49A, 49B may be referred to as stationary receiving units. The stationary receiving units 49A, 49B may form nodes of the network 46. The receiving units 49A, 49B may also terrestrially receive signals from the network operations center 12 through a wired or wireless connection. The towers 34A, B may redistribute the content to the other receiving units.

In addition, the satellites may also be replaced with another high altitude device such as a stratospheric platform 33 for transmitting content to the mobile device, transmitting communication signals, transmitting lost content segments and transmitting location-specific signals. Stratospheric platforms 33 are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The stratospheric platforms 33 may also include a receiving unit 51 that is used to receive signals from the satellite 18 and communicate signals through the network 46. The receiving unit 51 may be referred to as a stationary unit since the stratospheric platform maintains a particular position above the earth. The receiving unit 51 may also become part of the wireless network 46 and thus be used to transfer content segments or packets to another node of the device. The receiving units 49A, 49B and 51 may also be referred to as nodes of the network 46.

The present invention may also be used for displaying and communicating various wireless communication signals on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Each of the personal mobile device 36 may also be a node within the network 46. That is, each of the personal devices may be used to communicate content segments or packets to other devices in the node.

A building 44 having a receiving unit 41 with an antenna 42 may be used as a node of the network 46. The receiving unit 41 may be referred to as a stationary unit. The receiving unit 41 may be in communication with the satellite 18 and with the network 46. The receiving unit 41 may be dedicated to replacing lost content packets into the network. For a dedicated network node, the receiving unit 41 may be operated by the operator of the content distribution system.

The home 21A may include user receiving units 28C that are in communication with a server 47. Each receiving unit 28C and/or server 47 may communicate with the satellite through the antenna 26B. Each receiving unit 28C may also be in communication with a display 45 such as a television. Each receiving unit 28C may be associated with a display 45. Only one of which is shown for simplicity. The receiving unit 28C may be wirelessly in communication with the server 47 or a wired communication with server 47. An antenna 48C may be used by each receiving unit 28C to wirelessly be communicated if the system is so equipped.

The home 21B illustrates a plurality of receiving unit 28B that form a network but may also be in communication with the network 46. Both homes 21A and 21B may form separate networks that may or may not be in communication with the outside network 46. The receiving unit 28B may include network antennas in 48B. Each user device 48B may be in communication with the satellite antenna 26C. Of course, satellite antennas 26B and 26C may include multiple antennas. Each receiving unit may also be associated with a display 45. Only one display 45 is illustrated in each home 21A, 21B for simplicity.

Figure 2:
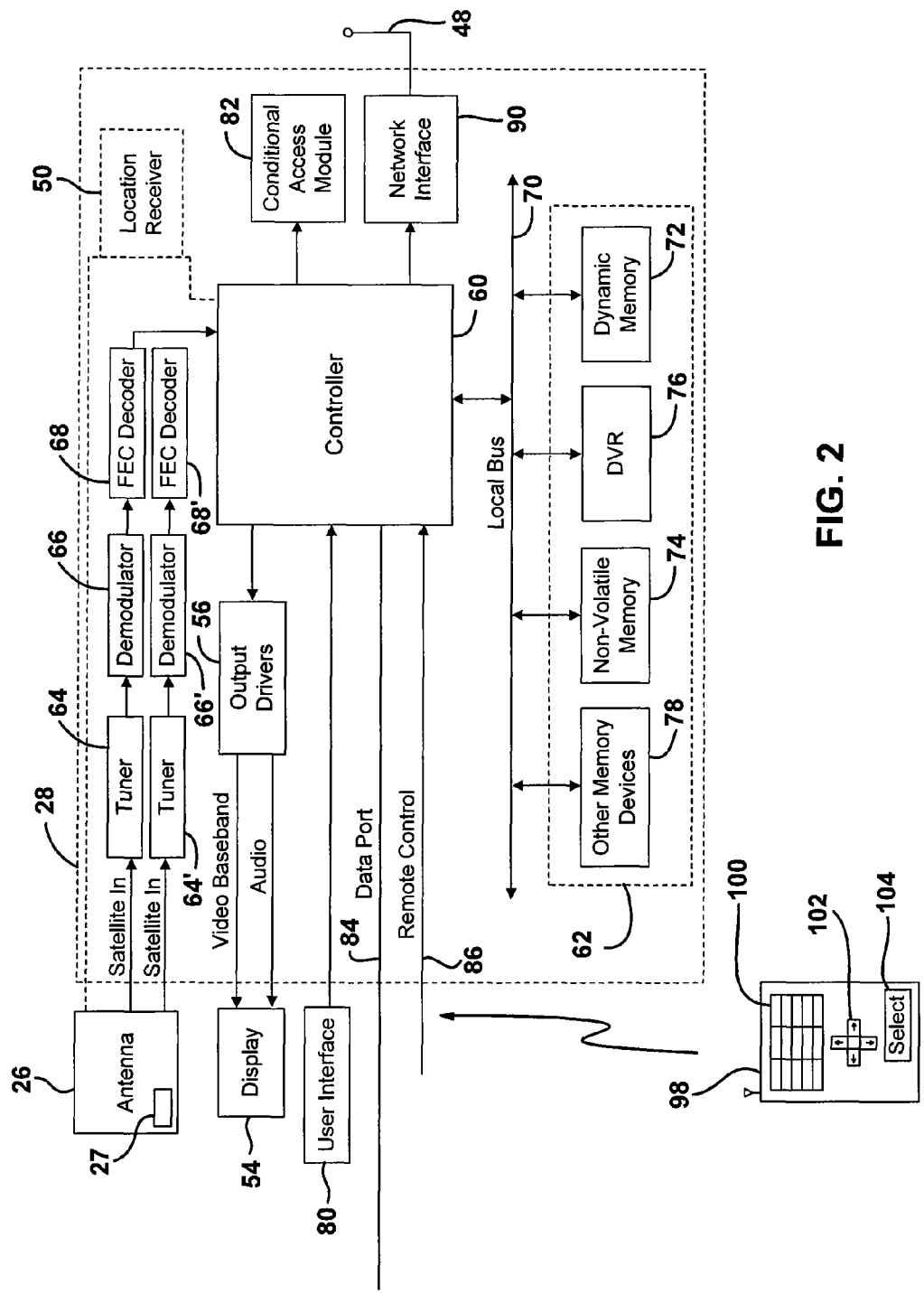
FIG. 2 is a detailed block diagrammatic view of a receiving unit of FIG. 1.

Referring now to FIG. 2, the various receiving units described above are collectively referred to as receiving unit 28 which is illustrated in further detail. The stationary receiving units 41, 49A, 49B, 51 and the personal mobile devices may also be configured in a similar manner to that of the receiving units 28. The receiving units may also be referred to as receiving devices or user devices. Antenna 26 may be various types of antennas including a rotating antenna which is used to track the relative movement of the satellite or other transponding device with respect to a vehicle. The antenna 26 may be a single antenna used for satellite television reception, or a number of antennas such as one for receiving television signals and one coupled to a location receiver 50 such as GPS receiver if used in a mobile device. The antenna 26 may also be an electronic antenna. The antenna 26 may include an internal controller 27 that controls the operation of the antenna 26. The stationary receiving units 28B, 28C, 41, 49A, 49B and 51 units may include a stationary antenna rather than a tracking antenna.

The location receiver 50 may be integrated into the receiving device 28 or outside the device. The location receiver 50 may be a GPS receiver. In a preferred embodiment, only one location receiver 50. However, the location receiver 50 may be external to the receiving unit such as part of the vehicle 24 or other part of the mobile receiving system. A controller 60 may be coupled directly to location receiver 50.

The location receiver 50 is capable of providing latitude and longitude to the controller 60. The controller 60 may be used to compare the location signals from the location receiver 50 to the boundaries of the areas of interest such that the mobile device can determine which areas of interest it is within and which areas of interest it is not within. From this determination it can control the receiving unit behavior such as allowing or disallowing display of certain audio or video channels or advertising or the like. The stationary receiving units 41, 49A, 49B and 51 units may not include the location receivers 50, 52.

The receiving unit 28 includes a display 54 associated therewith. The display 54 may be incorporated into the unit 28 or may be external to the receiving unit such as part of a vehicle 24 or television. The display 54 may have output drivers 56 used for generating the desired audio and video outputs suitable for the particular display 54. The stationary receiving units 28B, 28C, 41, 49A, 49B and 51 units may or may not include a display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DIRECTV® set top boxes which employ a chip-based multifunctional controller.

It should be noted that more than one tuner 64, demodulator 66 and forward error correction decoder 68 may be provided in the system. In this example, a second tuner 64', a second demodulator 66' and a second forward error correction decoder 68' may be provided in the receiving unit 28. Of course, various numbers of tuners may be incorporated into a receiving unit 28. The system may be scalable in that a cluster or network may consist of a few receiving devices within a building such as a house or dozens or hundreds of devices. Because massive amounts of bandwidth may be available in the near future, clusters may be able to communicate with each other to share programs is realistic. Constraints now include the amount of bandwidth available. Further, each receiving device does not necessarily need to be in communication with a satellite. Some user devices merely may receive information directly from another user receiving device. Further, clusters of devices may include a service provider supported cluster that is used to provide material. For example, the building 44 may be a network operator supported building that may provide content to other users within the network 46. The methods described below may be used to transfer the content to the various devices.

The controller 60 may include or be coupled to a local bus 70. The local bus 70 may be used to couple a memory including dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 76 may also be coupled to local bus 70. The other memory devices may include other types of dynamic memory, non-volatile memory, or may include such devices such as a digital video recorder. The display 54 may be changed under the control of controller 60 in response to the data in the dynamic memory 72 or non-volatile memory 74. Part of the memory 62 may be used as a buffer.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 64 is illustrated as part of the receiving unit 28. However, should the unit 28 be incorporated into a vehicle, the user interface 80 may be located external to the mobile receiving unit such as dial buttons, voice activated system, or the like incorporated into the vehicle and interface with the receiving unit.

A conditional access module 82 (CAM) may also be incorporated into the receiving unit. The access module 82 may include software to allow the receiving unit 28 access to various channels and wireless signals generated by the system. Not having an access card or not having an up-to-date access card 82 may prevent the user from receiving or displaying various wireless content from the system.

One user interface is a remote control device 98 having a key pad 100, an arrow key pad 102, and a select button 104 may also be provided. Inputs to the receiver 28 may be provided by the remote control device 28 or through another type of user interface 80.

The receiving unit 28 may include a network interface 90 for interfacing with other nodes of the network. The antenna 48 is used to communicate with other nodes of the network. The network interface 90 may be various types of communication cards such as an 802.11a/b/g wireless communication card, a WiMax card, or other types of wireless devices.

Figure 3:
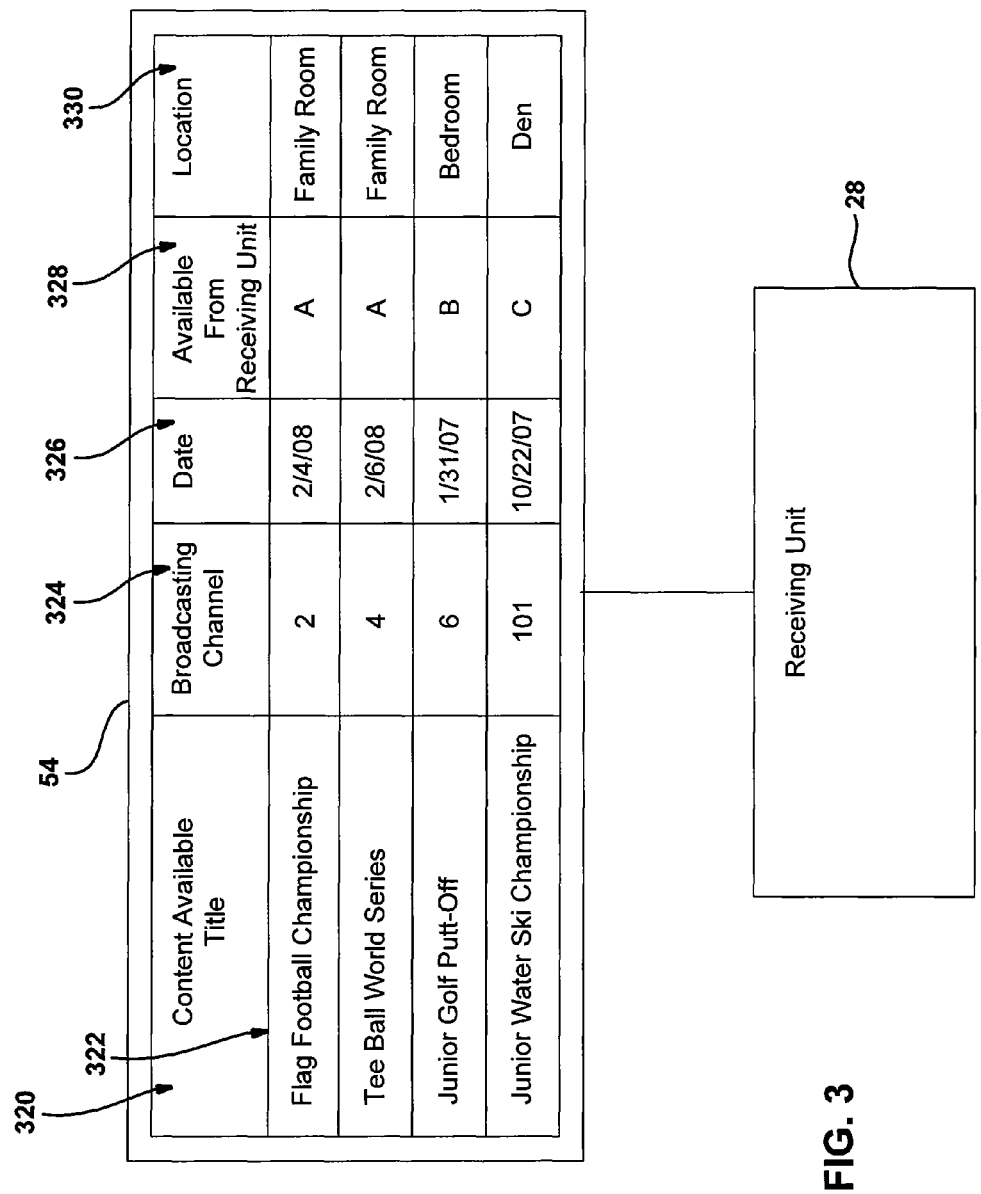
FIG. 3 is a screen display illustrating various content available from different user devices.

Referring now to FIG. 3, a receiving unit 28 is illustrated with display 54 illustrating a screen display 320. The screen display 320 may be generated by the receiving unit 28 that is in communication with other user devices. The screen display 320 may include content available titles in column 322. As illustrated, line 1 includes flag football championship, line 2 includes T-ball World Series, line 3 includes junior golf putt-off and line 4 includes junior water ski championship.

The screen display 320 may also include a column 324 for broadcasting channel which may include a logo or other information in the program guide. Call letters or an abbreviation for the network may also be provided in the broadcasting channel column 324. A date column 326 may also be provided. The date column 326 may be used to convey the date that the particular program was broadcast. The screen display 320 may state on which receiving unit the content is actually located. For example, the first two lines are associated with receiving unit A which is used to generate the screen display 320 in this example. The other two lines are examples of content available from receiving units B and C which are different receiving units on the network. The "available from user device" column 328 may thus include various information. An associated column 330 may also be provided. The location may provide a description of the location such as family room, bedroom or den as illustrated.

It should be noted that various other types of information may also be conveyed in a screen display. The programming guide of the DIRECTV® television system may include various information such as the actors, the film company, ratings and other information. Such items may be displayed readily or may be provided through selecting or clicking on information within the display 320.

The information from the other receiving units in the network may be conveyed upon a query from a requesting receiving unit. When the screen display 320 is selected, the receiving unit 28 may send a request for a content list and be provided a content list from the various user devices on the network. If a server is used, the server may maintain a master list of all of the titles within the network and communicate the list to the receiving units in the network. The operation of obtaining titles and recording various content will be evident from the description provided below.

Figure 4:
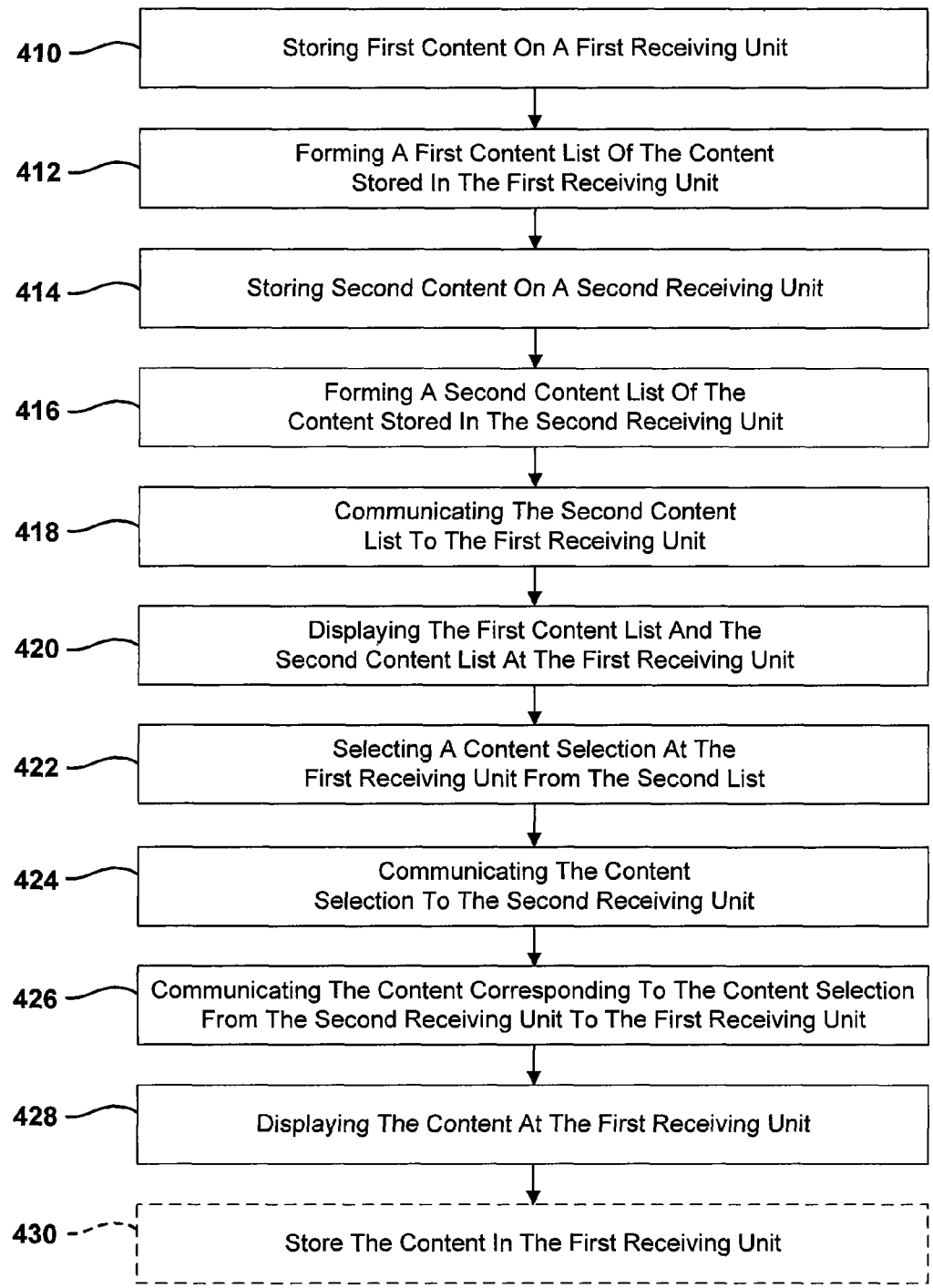
FIG. 4 is a flowchart of a method for communicating content to a second user device from a first user device that recorded the content.

Referring now to FIG. 4, the present disclosure provides a method that allows the resources of various numbers of receiving units to be shared throughout a network and thus allow efficient use of all the resources within the network. By allowing the receiving units to intercommunicate through a network, the efficient usage of resources may be arbitrated. This may be performed in a peer-to-peer manner or through the server 47 as illustrated in FIG. 1.

Each receiving unit that is a member of a cluster is uniquely identifiable using an identifier such as a numerical, alphabetical, or alphanumeric identifier. Selection of members of a cluster can be user configurable or automatically determined based upon probing the network and determining the receiving units that may be communicated to. Members of a cluster can be assigned from an external server or headend 12 as illustrated in FIG. 1.

Automatic configuration can be based on parameters such as latency, bandwidth, permissions and other capabilities or attributes.

In this example, a server or each receiving unit may provide a list of all programs recorded on it as well as recorded on the other receiving units of the network.

In step 410, content is stored on a first receiving unit. In step 412, a first content list of the content stored in the first receiving unit may be generated. This may be provided to the central server as mentioned above or communicated to other device. Step 412 may also be performed in response to a query from other receiving units in the network.

In step 414, a second content is stored on a second receiving unit. In step 416, a second content list of the content stored in the second receiving unit is formed. In step 418, the second content list is communicated to the first receiving unit. Again, this may be performed in response to a query from another device or may be provided on a regular basis or upon a change in the list.

In step 420, the first content list and the second content list are displayed at the first receiving unit. That is, a display such as that illustrated in FIG. 3 may be provided on the display 54 associated with the first receiving unit as illustrated in FIG. 3.

In step 422, a content selection may be formed at the first receiving unit from the second list. That is, content available or stored at the second receiving unit may be selected from the list. In step 424, the content selection is communicated to the second receiving unit. In step 426, the content corresponding to the content selection is communicated from the second receiving unit to the first receiving unit.

In step 428, the content may be displayed on a display at the first receiving unit. Alternatively, the content may be stored in the memory or digital video recorder of the first receiving unit.

Figure 5A:
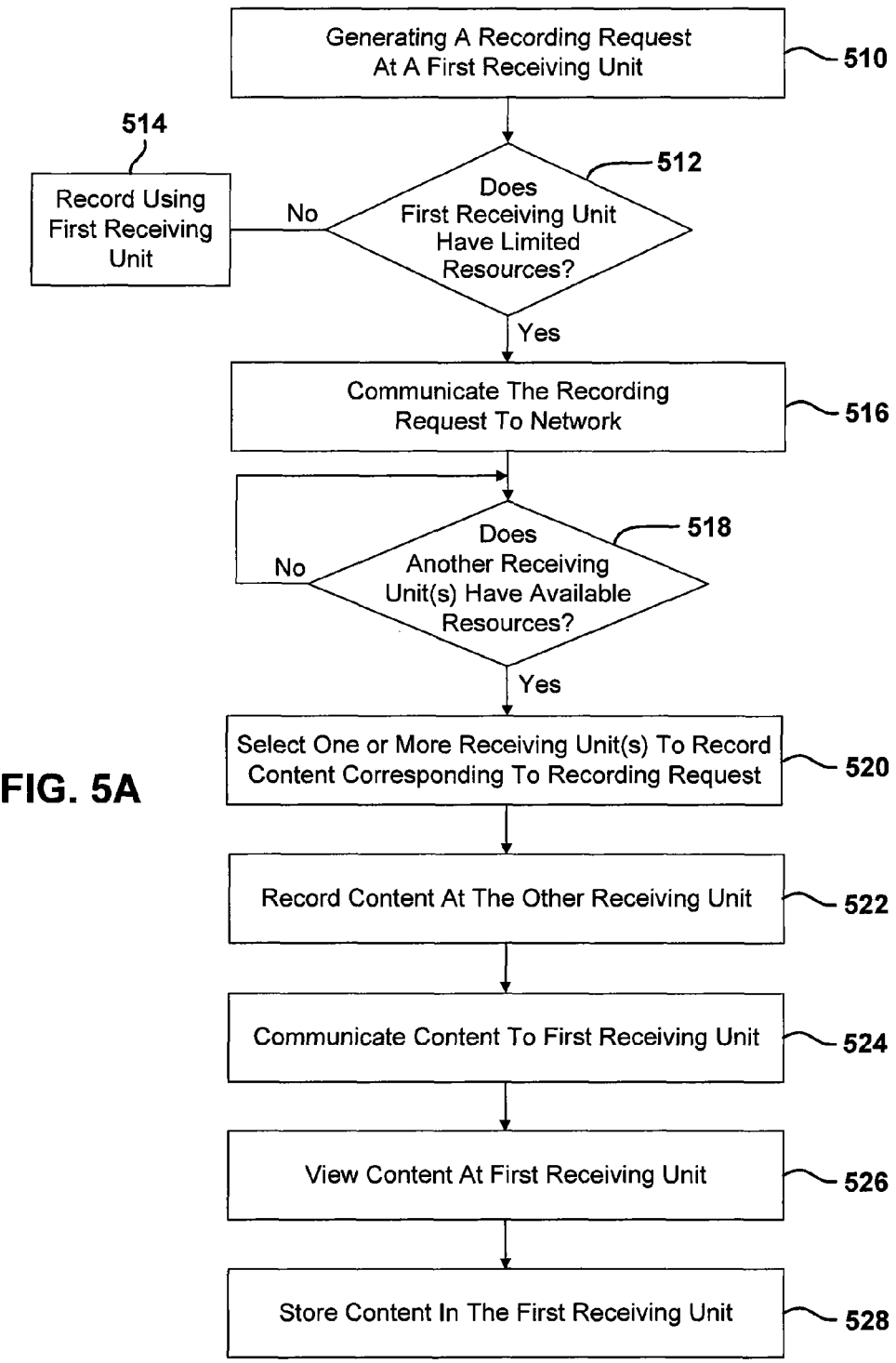
FIG. 5A is a flowchart of a method for using idle user device resources.

Referring now to FIG. 5A, a method for using idle resources in the cluster is set forth. In step 510, a recording request is generated at a first receiving unit. In step 512, it is determined whether the first receiving unit has an unused tuner. If the first receiving unit does have an unused tuner, the first receiving device records the particular content at the particular time. In step 512, if the first receiving device does not have an unused tuner, step 516 may communicate the recording request to the network.

In step 518, an example of a query process may generate a query signal that queries whether one of the other receiving devices is available. A selection process may take place using a peer-to-peer network which may use selection criteria to form the selection. If the system includes a server, the server may perform the selection using the selection criteria. Examples of selection criteria include, but are not limited to, the number of tuners available, bandwidth available or memory space available at any particular device. These criteria may be used individually or in various combinations. If the particular device is not available, another device may be selected again in step 518. Once another available device is found in step 518, step 520 may be performed. For example, a second receiving unit may be selected to record the content corresponding to the recording request.

A variable of this algorithm can be to split the tuning and streaming amongst 'n' receiving units that are peers. If various receiving devices have free resources at various times then the requests can be parceled out to other devices. Say for example one program spans 2 hours and there are three devices that can record portions of the program but none can record the entire program continuously. The cluster can determine this and parcel out the recordings and later on stitch the complete recording together. In the case of a number of receiving units, more than one may be selected in step 520.

In step 522, the entire content or content segments are recorded or stored within the memory of the second receiving unit or plurality of other receiving units. In step 524, when the first receiving unit desires to view the programming, the second receiving unit may stream the programming to the first receiving unit. In step 524, the content or content segments are communicated to the first receiving unit from the second receiving unit on the plurality of other receiving units. This may be performed with the individual segments to the first unit which stitches together the content or through a server which may stitch together the content. In a peer-to-peer system, one of the other units could also stitch together the content before communicating it to the first receiving unit. In step 526, the content or assembled content may be viewed at the first receiving device. In step 528, the content may be stored in the first receiving unit. Either step 526 or step 528 may be performed. Further, both steps 526 and 528 may be performed. Streaming the content in step 524 may take place at various times including when requested by the first receiving device. That is, when a user desires to watch the particular content, a request may be generated from the first receiving unit to the second receiving unit. Further, the first receiving unit may receive the content through the network at any time during the recording of the content. Further, the second receiving device may also communicate the content once the entire content has been recorded and stored within the memory.

It should be noted that the selection process in step 518 may be performed based on various characteristics of the receiving unit, such as the connectivity speed, the disk space available or the number of tuners available.

Figure 5B:
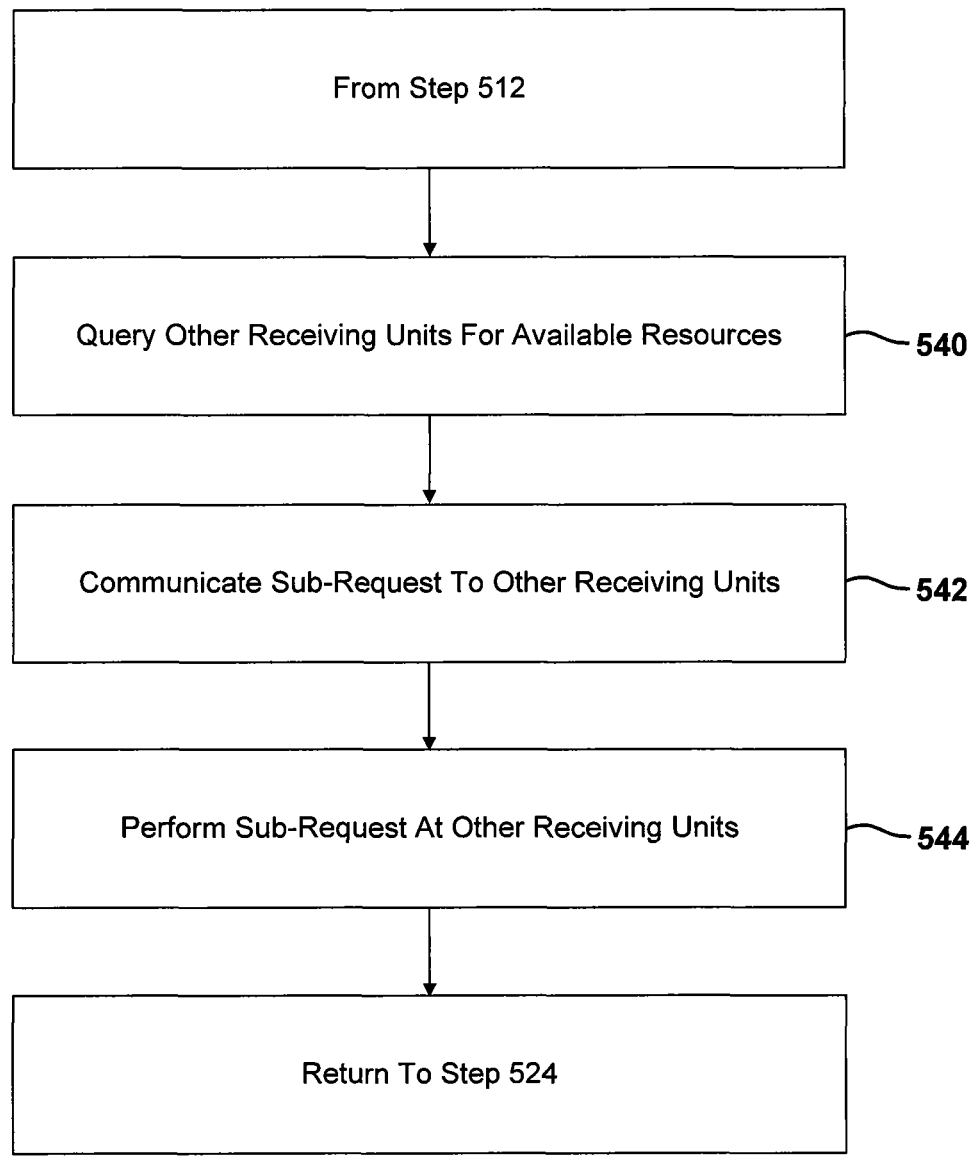
FIG. 5B is a partial flowchart of an alternative method for a portion of FIG. 5B.

Referring now to FIG. 5B, another variation of FIG. 5A is set forth. In this embodiment a recording request may be segmented into sub-requests corresponding to the various resources of the various receiving units of the network. For example, each receiving unit may provide tuning, data stream processing and data storage. Therefore, each recording request may be divided into a sub-request such as a tuning request, a data stream processing request, and a data storage request. Each of the sub-requests may be fulfilled using a different receiving unit. The receiving units may each have different available resources. Each of the receiving units may also have completely different characteristics such as one of the receiving units may include a massive centralized hard disk for storage. FIG. 5B is an alternate to a portion of FIG. 5A. The steps 510-512 may be performed as in steps 5A. In step 540, a query of other receiving units for available resources may be generated. The requesting unit may receive this information from a server or from the peer-to-peer network. The query for available resources may include the various resources such as tuning availability, data stream processing availability or data storage availability for each of the receiving units within the network. In step 542, sub-requests may be generated to other receiving units to perform the various sub-requests. In step 544, the sub-requests are performed at the various other receiving units. Thereafter, step 524 may be performed in which the content is communicated ultimately to the first receiving unit so it may be viewed at the first receiving unit.

By way of example, the sub-request in step 542 may be a request to a second receiving unit that includes a free tuner but no disk space. A third receiving unit may include free disk space but no free tuners. The second receiving unit may communicate a request for recording space to the third receiving unit. Or, the first receiving unit or a server within the network may form the sub-request. The recording request may thus allow the second receiving unit to receive the content through a free tuner and then stream the content through the network to the third receiving unit so that it may be stored therein. The content may then be transmitted from the third receiving unit to the first receiving unit in step 524.

Figure 6:
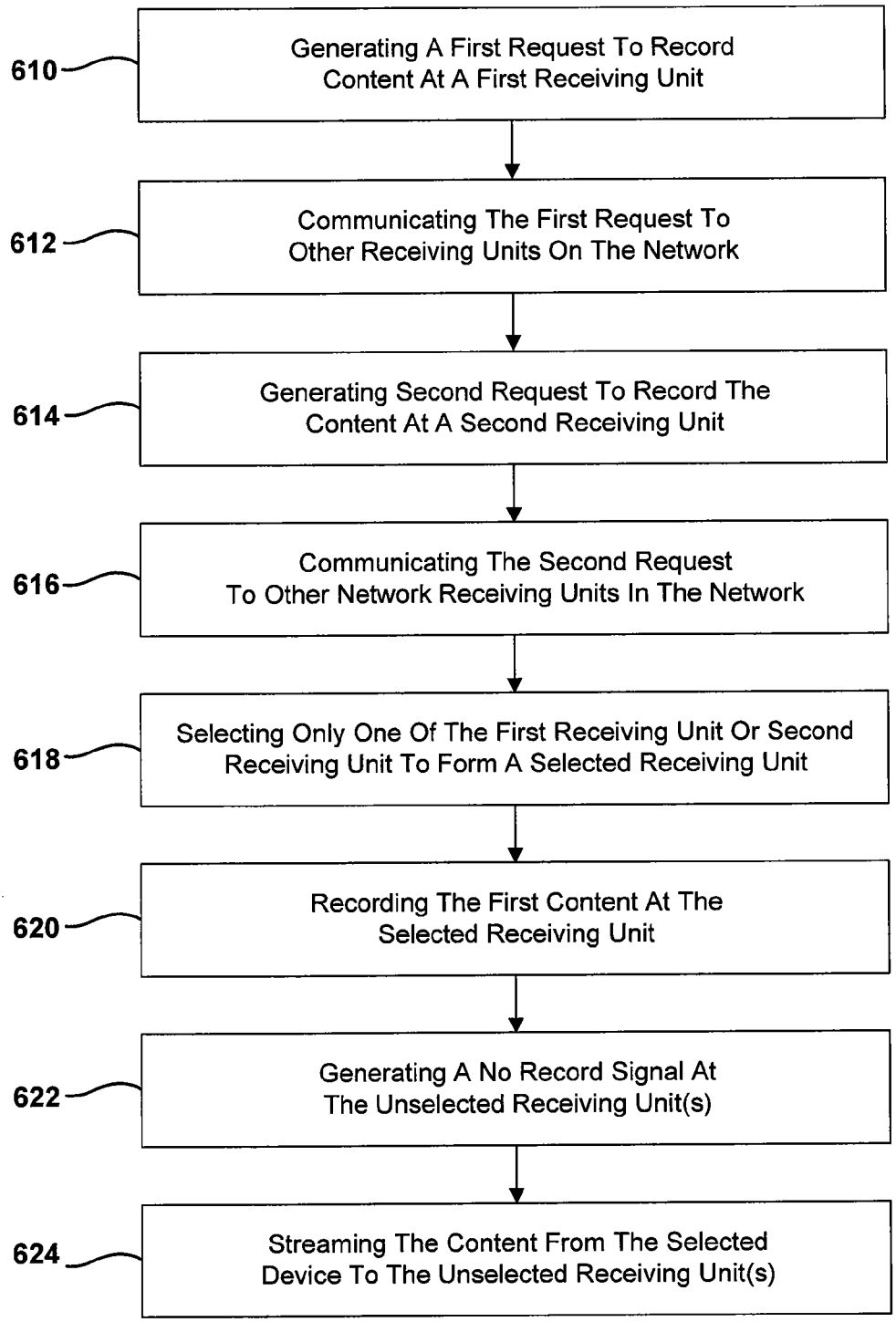
FIG. 6 is a flowchart of a method for allowing multiple IRDS to record the same program while minimizing use of system resources.

Referring now to FIG. 6, a method for storing content when multiple receiving units request the same program is set forth. That is, if more than one receiving unit wants to record the same program, one receiving unit may be chosen to record the content while other receiving units are told not to record the content. When the non-recording receiving unit would like to watch the program, it may be streamed from the recording receiving unit.

In step 610, a request may be generated to record content at a first receiving unit. In step 612, the request may be communicated to other devices on the network. In step 614, a second request to record the same content at a second receiving unit may be generated. In step 616, the second request may be communicated to the other receiving units in the network.

In step 618, if a server is involved, the server may communicate a selection of one of the receiving units to perform the recording of the first content. In a peer-to-peer system, arbitration techniques may be used to decide which of the receiving units may perform the recording. As mentioned above, various characteristics of the receiving units, such as connectivity speed, free hard disk space, or the number of free tuners, may be used as criteria. In step 618, only one of the first or second receiving units may be chosen as the selected receiving device if the recording requests are redundant. The recording requests are redundant when requesting the same content. As a result, the other devices are unselected. In step 620, the first content may be recorded or stored within the selected receiving device.

In step 622, a "do-not-record" signal may be generated and communicated to the other devices. In this manner, the other devices may become unselected devices. The "do-not-record" signal is used to prevent other devices on the network from recording the content.

In step 624, the content may be streamed from the selected device to one of the unselected devices when the unselected device desires to watch the particular content. The selection may be performed using a menu such as that illustrated in FIG. 3. In this manner, various programs stored on various receiving units may be selected for streaming.

Figure 7:
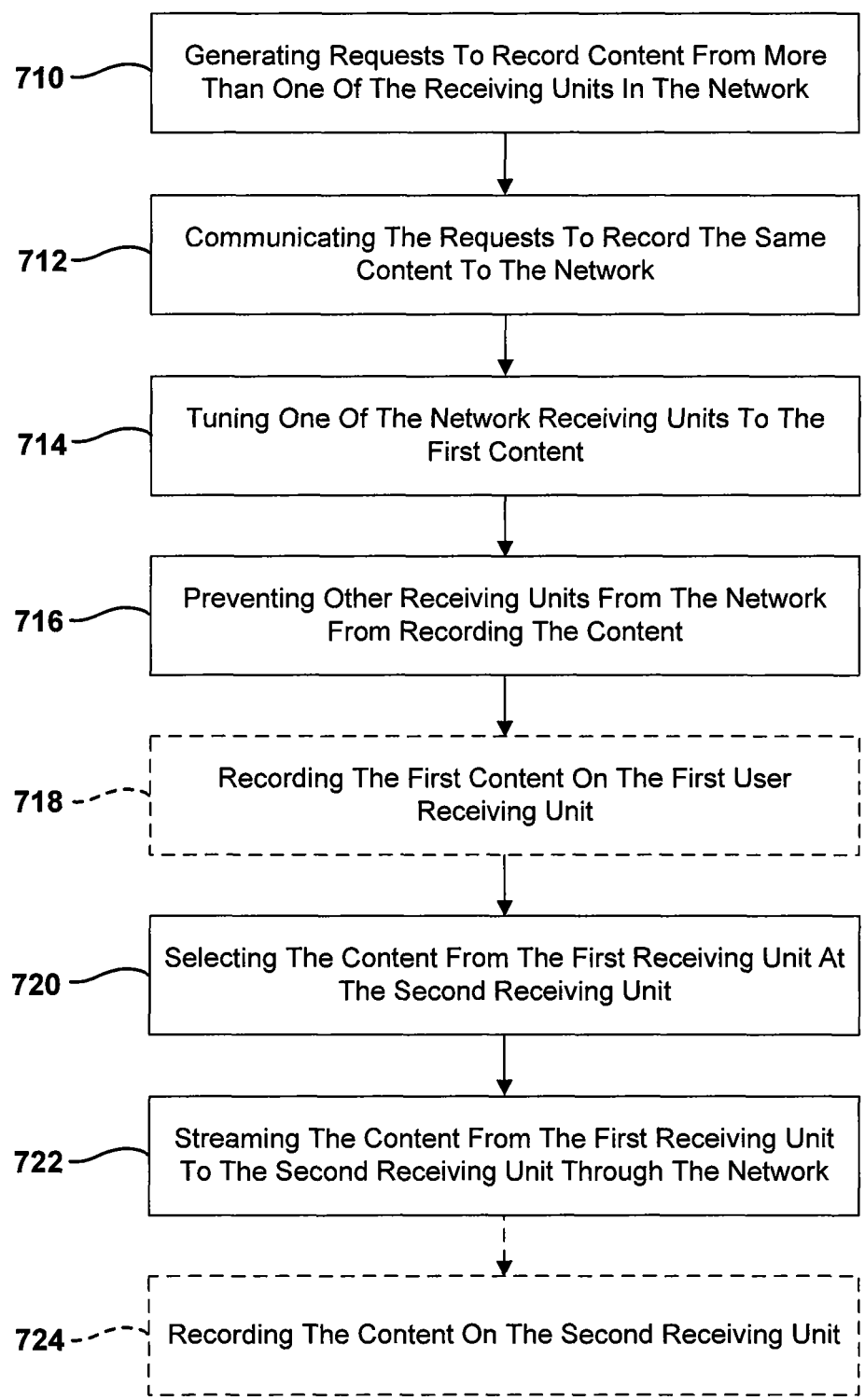
FIG. 7 is a flowchart of a method for arbitrating a recording request from multiple user devices.

Referring now to FIG. 7, an alternative method to that described above with respect to FIG. 6 is performed. In this method, the program may be immediately streamed from the receiving unit. In step 710, requests to record or tune to content or the same content from more than one of the receiving units in the network are generated. That is, a first and second receiving unit may request that the same content be recorded or be tuned to. In step 712, the requests to record or tune to the same content are communicated to the other receiving units in the network. This may be done using a central server or through a peer-to-peer network.

In step 714, one of the network devices is tuned to record the first content. The recording device or the recording receiving unit may be chosen based upon various factors including connectivity speed, free hard disk space or the number of free tuners. Of course, more than one factor may also be used in the arbitration process. In step 716, a signal such as a "do-not-record" signal is provided to prevent the other devices in the network from recording or tuning to the content.

In step 718, the first content may be stored or recorded in the first user device. This step is an optional step.

In step 720, the content from the first device may be selected at the second device. That is, the second device may be provided with a menu so that content stored within the first device may be selected. In step 722, the content from the first device is streamed to the second device through the network. Optionally, step 724 may record the content on the second device. However, recording the content may not be required since the content may merely be streamed through the network to the second receiving unit.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of controlling a system that includes a network having a plurality of set top boxes (STBs), each of the plurality of STBs comprising at least two tuners, at least two demodulators, at least two decoders, a network interface, and data storage comprising:
   receiving a first television signal at a first set top box (STB) through a first tuner, a first demodulator, and a first decoder;
   forming a recording request for content at the first STB of the plurality of (STBs);
   determining the first STB includes unavailable resources, wherein the unavailable resource is at least one of tuning availability, data stream processing availability or data storage availability, in response to receiving the first television signal and determining that the first STB includes unavailable resources, communicating the recording request for the first STB from the network interface of the first STB through the network to the second STB;
   receiving the recording request at the network interface of the second STB, the second STB of the plurality of STBs having a second tuner, second demodulator and second decoder that are available;
   determining the second STB includes unavailable storage, and in response to receiving the recording request and determining that the second STB includes unavailable storage, communicating the recording request to the third STB:
   receiving the recording request at the network interface of a third STB of the plurality of STBs having a storage device that is available;
   receiving a second television signal at the second STB through the second tuner, second demodulator and second decoder, said second television signal corresponding to the content;
   receiving a third television signal at the third STB through the second tuner, second demodulator and second decoder;
   streaming the content through the network interface of the second STB to the network interface of the third STB; and
   storing the content in the storage device associated with the third STB.

2. A method as recited in claim 1 wherein the recording request comprises sub-requests comprising at least one of a request to receive a data stream, a request to process the data stream or a request to store a processed data stream to the storage device.

3. A method as recited in claim 2 further comprising reconciling the sub-requests independently by the plurality of STBs, the STBS forming a processing chain for taking an output from another of the plurality of STBs; and
   communicating a resultant output to another of the plurality of STBs.

4. A method as recited in claim 1 wherein the first STB, the second STB and the third STB comprise satellite STBs.

5. A method as recited in claim 1 further comprising communicating the content from the storage device to first STB.

6. A method as recited in claim 5 further comprising displaying the content at a display associated with the first STB.

7. A method as recited in claim 1 further comprising streaming the content from the storage device to first STB.

8. A method as recited in claim 7 further comprising displaying the content at a display associated with the first STB.

9. A system comprising:
   a network having a plurality of set top boxes (STBs), each of the plurality of set top boxes (STBs) comprising at least two tuners, at least two demodulators, at least two decoders, and a network interface;
   a first set top box (STB) of the plurality of STBs, said first STB forming a recording request for content, when the first STB includes unavailable resources wherein the unavailable resource is at least one of tuning availability, data stream processing availability or storage availability, communicating the recording request through the network through a first network interface of the STB in response to receiving a first television signal and determining that the first STB includes unavailable resources;

a second STB receiving a second television signal, through a second tuner, a second demodulator and second decoder, said second television signal corresponding to the content;

a third STB receiving a third television signal through a third tuner, third demodulator, third decoder, and the storage device network interface, said third network interface receiving the content from the second network interface; and a storage device storing the content in a third storage device associated with the third STB.

10. A system as recited in claim 9 wherein the recording request comprises sub-requests comprising one of a request to receive a data stream, a request to process the data stream and a request to store a processed data stream to the storage device.

11. A system as recited in claim 10 wherein the sub-requests are independently serviced and reconciled by the plurality of STBs, the STBs forming a processing chain for an output from another of the plurality of STBs and communicating a resultant output to another of the plurality of STBs.

12. A system as recited in claim 9 wherein the first receiving unit, the second receiving unit and the third receiving unit comprise satellite receiving units.

* * * * *